July 8, 1958 P. H. MILLER 2,842,014
RIGID BORING BAR
Filed May 17, 1954 2 Sheets-Sheet 1
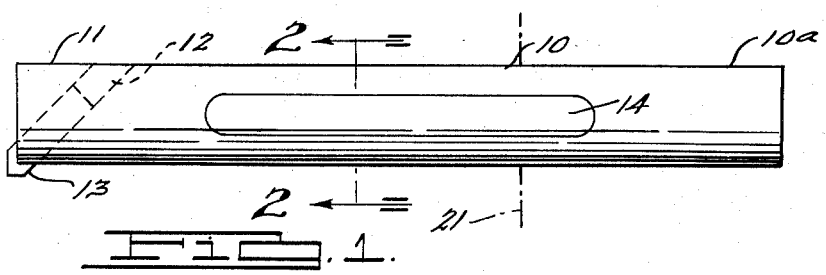
Fig. 1.
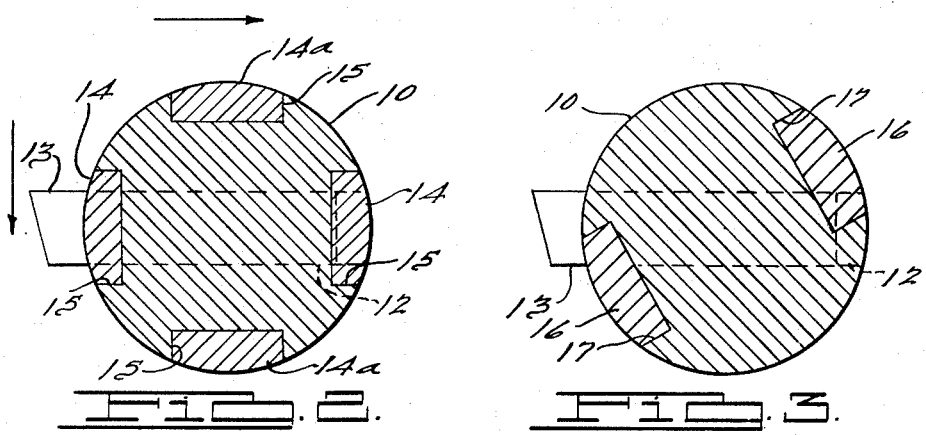
Fig. 2. Fig. 3.
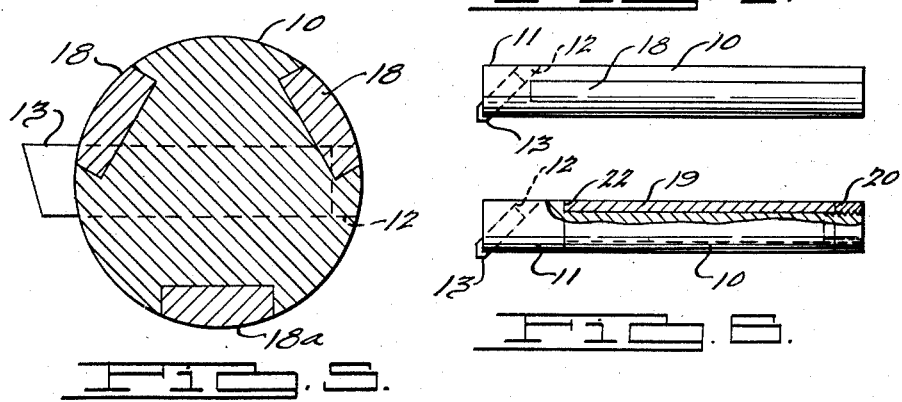
Fig. 4.
Fig. 5. Fig. 6.
INVENTOR.
Paul H. Miller
BY
Harness, Dickey & Pierce
ATTORNEYS.

July 8, 1958  P. H. MILLER  2,842,014
RIGID BORING BAR

Filed May 17, 1954  2 Sheets-Sheet 2

INVENTOR.
Paul H. Miller
BY
Harness, Dickey & Pierce
ATTORNEYS

United States Patent Office 2,842,014
Patented July 8, 1958

2,842,014

RIGID BORING BAR

Paul H. Miller, Berkley, Mich.

Application May 17, 1954, Serial No. 430,127

9 Claims. (Cl. 77—58)

The present invention relates to boring bars, particularly to boring bars having a high ratio of length to diameter such as are required for use in machining of the interior surfaces of deep, interior bores or holes.

In the machining of the interior surfaces such as those of bearings, cylinders, and the like, it is usually necessary to attach a cutting tool or bit of cemented carbide or of special cutting steel to the end of an elongated bar of tough, non-brittle steel, in order to insert the bar and cutting tool inside an interior hole or bore of the workpiece. Where such holes are deep in proportion to the diameter, difficulties are frequently encountered in meeting the required specifications of tolerance on the hole size and quality of finish because the more elongated boring bars are more susceptible to deflection and chatter. To minimize deflection and chatter the rate of metal removal must be kept low and under these conditions it is not possible to obtain the full production capabilities of man and machine.

In the past, boring bars usually have been made of steel. The latter have not been satisfactory in the longer lengths and smaller diameters. In some cases, the high ratio bars have been made of high modulus metals to increase rigidity. However, boring bars of these materials are prohibitively expensive and, moreover, are brittle and subject to accidental breakage.

It is a principal object of this invention, therefore, to provide a boring bar which is sufficiently rigid without brittleness and without being excessively costly.

Other objects and advantages of the invention will become apparent in the description of the invention to follow, taken in conjunction with the accompanying drawings of which:

Figure 1 is a side elevation of a cantilever type rigid boring bar of this invention, showing in particular the longitudinal disposition of one of four longitudinally disposed reinforcing members;

Fig. 2 is a cross sectional view taken along the line 2—2 of Fig. 1, showing the peripheral disposition of the four reinforcing members;

Fig. 3 is a cross sectional view of a second embodiment of a cantilever-type bar of this invention, showing in particular the peripheral disposition of two reinforcing members;

Fig. 4 is a side elevational view of a third embodiment of a cantilever-type boring bar of this invention showing in particular the longitudinal disposition of one of a number of reinforcing members extending the length of the shank;

Fig. 5 is a cross sectional view of a fourth embodiment of a cantilever-type boring bar of this invention, showing in particular the peripheral disposition of three reinforcing members;

Fig. 6 is a side elevational view, with portions broken away, showing a fifth embodiment of this invention, in particular, showing a cylindrical reinforcing sleeve attached to the shank of a cantilever-type boring bar by means of a screw-threaded collar or cap.

Figure 7:
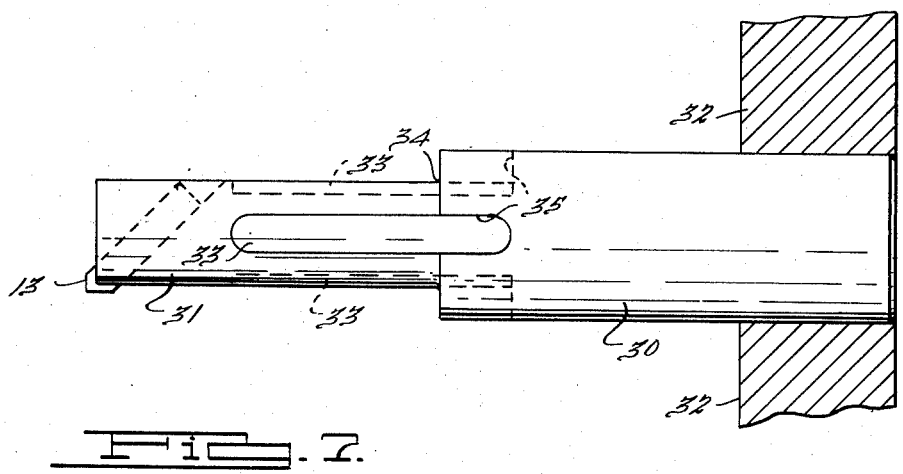
Fig. 7 is a side elevational view of still another cantilever-type boring bar of this invention, in particular, a bar having a larger shank portion and a smaller tool-holding head portion.

Referring now to the drawings, and first Figs. 1 and 2 thereof, it will be seen that the boring bar therein illustrated is a cylindrical bar having an elongated shank portion 10, a head portion 11 and an angularly-disposed tool holding slot 12 into which is fitted a small cutting tool or bit 13. The shank 10 and head 11 are of a tough, non-brittle metal such as a good grade of tool or alloy steel. In the outer periphery of the shank 10, four strips 14, 14 and 14a, 14a of a metal having a materially higher modulus of elasticity are anchored in slots 15, 15 extending longitudinally of the shank. In the bar of Figs. 1 and 2, it will be seen that the outer surfaces of strips 14, 14a are curved so as to form a continuous surface with a circumference of the shank 10. An alternate and similarly effective construction would be to position the strips 14, 14a slightly below the peripheral surface of the shank. The latter method would probably be less costly in many cases. Either method would permit the bar to be inserted into a tool holder to a depth indicated approximately by the dotted lines identified by the numeral 21. To obtain maximum effectiveness in resisting deflection, the reinforcing strips extend into the tool holding device as indicated and roughly in proportion to the diameter of the bar and size of reinforcing strip. The strips could be extended to the extreme end of shank portion 10a, but this would not result in economical use of the high modulus strip metal. It should also be noted that strips 14, 14 are located in the periphery of the shank 10 with their centers in the plane of the axis of the tool 13. When so positioned, the strips 14, 14 resist sideward deflection of the bar away from the work in the direction of the top arrow. Likewise, strips 14a, 14a are positioned with their centers at about right angles to strips 14, 14, thereby to resist deflection of the bar in a downward direction away from the cutting edge (in the direction of the vertical arrow). The four strips thus will be seen to combine to oppose deflection of the bar in any direction. Such a disposition of reinforcing strips or members makes the bar sufficiently rigid as to be capable of heavy duty use. The total cost of the strips of high-cost material is small compared to that of a solid bar of the same or similar materials. Use of this bar permits the use of maximum depth of cut, maximum rate of feed, and materially improves the surface finish over that obtainable with an ordinary unreinforced steel boring bar of the same length.

In the boring bar of Figs. 1 and 2, the strips 14, 14 and 14a, 14a are secured to the shank 10 by soldering, brazing, high strength metal-bonding cement or by screws, collars or other mechanical fastening devices. Soldering or brazing at lower temperatures or suitable cement or mechanical fastening devices are much preferred.

Referring now to Fig. 3, the cross sectional view shown therein is of a boring bar having only two carbide reinforcing strips 16, 16 disposed in such a way as to resist both sidewards and downwards deflection away from the work. In order to do this, the strips 16, 16 are disposed in slots 17, 17 located on opposite sides of the bar with one of them positioned at an angle of more than 90 degrees with respect to the plane of the horizontal axis of the tool 13 (i. e. measuring the angle on a cross section, as in Fig. 3, and starting the measurement on the cutting side thereof). The exact angle is not critical, though at least one of the strips 17, 17 preferably should be located at an angle of less than 150–160 degrees in order to produce a bar sufficiently resistant to both the horizontal and downward deflection. This arrangement of only two strips is a more economical use of expensive high modulus materials and produces a boring bar which is satisfactory for the average boring and finishing application.

In Figure 4, the boring bar therein shown has one or more reinforcing strips of high modulus metal which extend to the extreme end of the shank 10. This construction is primarily most suitable to applications wherein the shank of the bar extends only a short distance into the holder. The reinforcing strips in this instance are made flush with the periphery of the shank or slightly below. It is to be understood that all embodiments of the invention may have the reinforcing strips extended in this manner.

The boring bar shown in cross section in Fig. 5 has three reinforcing strips 18, 18 and 18a disposed in such a manner to best resist deflection of the shank 10. The three strips are disposed around the periphery or circumference of the shank 10 at about equal intervals of 120 degrees. Of these, the strips 18, 18 are located with their centers each at an angle of 30 to 60 degrees with respect to the axis of the cutting tool. Disposed in this manner, strips 18, 18 furnish resistance to sideward or horizontal deflection of the bar away from the work while all three strips 18, 18, 18a contribute to the resistance to downward deflection. Sideward deflection is the major cause of inability to maintain size and downward deflection is the major cause of chatter and poor finish. This arrangement of reinforcing members provides a bar having substantially the same resistance to deflection in any direction and is economical and inexpensive to manufacture. The composite boring bar made in this manner is of remarkable rigidity.

Though Figures 1 to 5 show the use of two, three or four reinforcing members, any number may be employed. In some instances, a single reinforcing member may be satisfactorily employed providing it is positioned so as to resist deflection in the most undesirable direction in the particular application. On the other hand, the strips may completely enclose the outer circumference of the shank 10. Fig. 6 illustrates the latter embodiment, a continuous sleeve 19 of high modulus metal such as carbide encircling the shank 10 of the bar. In this arrangement, the end of the shank 10 is provided with screw threads. A screw-threaded locking collar or cap 20 is provided to be screwed onto the end of the shank 10 to hold the sleeve 19 tightly in place. This latter arrangement makes a most rigid boring bar and, of course, it also is the most expensive construction. The sleeve 19 also could be soldered, brazed or cemented in place. Instead of being fitted into place in or against a shoulder or recess 22, as shown in Fig. 6, the sleeve 19 could be fitted over a simple, straight shank and soldered, brazed or cemented in place on both ends. This type of reinforcement can be applied both to a cantilever and piloted type of boring bar.

As will be appreciated, the size of each of the reinforcing members may vary considerably and they need not all be of the same size or shape. However, it has been found necessary, with the better reinforcing materials, that each of the reinforcing strips should have a thickness of at least 15% and a width of at least 25% of the bar diameter in order materially to increase the rigidity of the composite bar. It is preferred to utilize dimensions generally larger than these lower limits, as has been illustrated in the drawings.

Figs. 1 through 6 of the drawings illustrate the use of reinforcing strips or members on straight shanked boring bars. In some heavy duty applications, it may be desirable to make the shank of the bar larger than the bit-holding end. Fig. 7 shows an illustrative method of reinforcing such a bar. As shown, the bar of Fig. 7 has an enlarged shank portion 30 and a smaller tool or bit-holding section 31 which meet to form a shoulder 34. Since such a bar is of the cantilever type with the large shank 30 being inserted in the jaws 32, 32 of a tool-holding device, the greatest bending effect occurs at the shoulder 34. To overcome this, the carbide strips 33, 33 are disposed in open slots 35, 35 which are extended back into the larger shank end of the bar. In such a position, the reinforcing members rigidify the bar in the same manner as in the bars of the other figures of the drawings. When made in this fashion, the boring bar will successfully handle extremely heavy duty applications.

Figure 8:
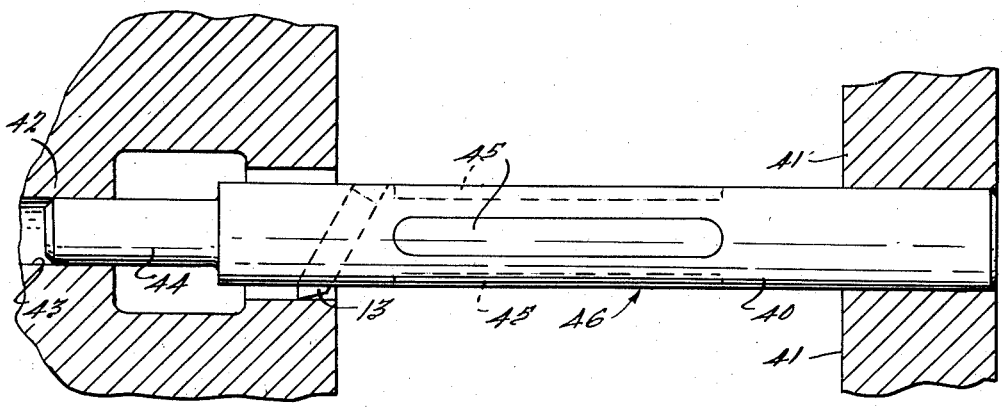
Fig. 8 is a side elevational view of a piloted type of boring bar embodying the present invention.

As will be appreciated, some boring applications are so difficult as to be entirely beyond the capabilities of the cantilever-type of bar, even when reinforced according to this invention. In such cases, a reinforced bar of the piloted type may be employed. Such a bar is shown in Fig. 8. In this form, the elongated bar has a shank portion 40 gripped in the jaws 41, 41 of a tool holder and a pilot shank 44 extending beyond the tool bit 13 and disposed so as to rotate in a pilot hole 43 located in the workpiece 42. The tool bit 13 is located at an intermediate position on the elongated bar so as to be supported on both sides. In this arrangement, the zone of greatest bending effect occurs near the center of the bar, indicated by the numeral 46. For this reason, a number of carbide strips 45, 45 are disposed in slots which do not extend into the tool holder jaws 41, 41 or into the pilot hole 43. In this arrangement, also, the reinforcing strips need not be flush with the surface of the bar and may have a square or rectangular cross section projecting above the surface of the bar, if desired.

As is apparent from the various figures of the drawings, the size, configuration, length and location of the reinforcing members also may be varied in order to derive the maximum rigidity in the operation contemplated for the amount of reinforcing metal utilized.

The reinforcing members such as the strips or sleeves shown in the drawings should be of a metal having a modulus of elasticity in the range of 72 to 90 millions lbs./sq. in. The cemented or sintered carbides of the refractory metals are a particularly satisfactory type of reinforcing material. These materials have a modulus in the above range which is two to three times that of steel. Of these, the carbides of tungsten, tantalum, and titanium are illustrative, commercially available materials which have been found particularly satisfactory.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A composite, rigid boring bar comprising a shank section of steel, a tool grip for holding a suitable cutting tool, a cylindrical sleeve of a cemented carbide mounted on at least a portion of the length of said shank section, the inside surface of said sleeve being in contact with the outer surface of said shank section along the entire length of said sleeve, said sleeve having a depth of at least 15% of the diameter of said shank, and being rigidly attached to said shank section.

2. A composite, rigid boring bar of the cantilever type comprising a shank section and a tool-gripping head of steel, a plurality of strips of a cemented carbide, said strips having a depth of at least 15% and a width of at least 25% of the diameter of said shank section and being anchored in place in longitudinal slots located in said shank, said strips extending from a point adjacent to said tool mounting means at least to a point adjacent said mounting portion.

3. A composite, rigid boring bar, as claimed in claim 2, wherein at least two of said carbide strips are located with their centers in the plane of the axis of a tool located in said head and at least two of said strips are positioned with their centers at approximately right angles to the first two said strips.

4. A composite, rigid boring bar, as claimed in claim 2, wherein the said shank is round in cross section, the number of said carbide strips is two, and the latter are positioned with their centers on opposite sides of the bar with one said strip disposed at an angle of more than 90 degrees with respect to the horizontal axis of a tool located in said head, said angle being taken as if on a cross section of said shank and measuring circumferentially from the cutting side thereof.

5. A composite, rigid boring bar, as claimed in claim 2, wherein the number of said strips is three, and the latter are positioned in said shank periphery at about equal intervals of 120 degrees, to provide substantially the same resistance to deflection in all directions.

6. A composite rigid bar for boring and the like comprising a shank section having a head portion at one end and a mounting portion at the opposite end, tool mounting means in said head portion, at least one elongated reinforcing insert rigidly secured in the periphery of said shank section and extending from a point adjacent to said tool mounting means at least to a point adjacent to said mounting portion, said reinforcing insert having a modulus of elasticity materially higher than that of said shank portion and in the range of 72 to 90 million lbs./sq. in.

7. A composite rigid bar for boring and the like comprising a shank section having a head portion at one end and a mounting portion at the opposite end, tool mounting means in said head portion, at least one elongated reinforcing insert rigidly secured in the periphery of said shank section and extending from a point adjacent to said tool mounting means at least to a point adjacent to said mounting portion, said reinforcing insert having a modulus of elasticity materially higher than that of said shank portion and in the range of 72 to 90 million lbs./sq. in., said reinforcing inserts having a depth at least 15% and a width at least 25% of the shank diameter.

8. A composite rigid bar for boring and the like comprising a shank section having a head portion at one end and a mounting portion at the opposite end, tool mounting means in said head portion, at least one elongated reinforcing insert rigidly secured in the periphery of said shank section and extending from a point adjacent to said tool mounting means at least to a point adjacent to said mounting portion, said reinforcing insert having a modulus of elasticity materially higher than that of said shank portion and in the range of 72 to 90 million lbs./sq. in., said reinforcing insert mounted in said shank such that the outer surface of said insert is closely adjacent to the shank periphery.

9. A composite, rigid boring bar comprising a shank section of steel, a tool grip for holding a suitable cutting tool, a cylindrical sleeve of a cemented carbide mounted on at least a portion of the length of said shank section, and rigidly secured thereto, said sleeve extending from a point adjacent to said tool mounting means at least to a point adjacent said mounting portion.

References Cited in the file of this patent

UNITED STATES PATENTS

| | | |
|---|---|---|
| 1,350,394 | Van Der Vorn | Aug. 24, 1920 |
| 1,414,565 | Gallagher | May 2, 1922 |
| 2,197,162 | Smith | Apr. 16, 1940 |
| 2,418,021 | Fleischer | Mar. 25, 1947 |
| 2,426,359 | Lankheet | Aug. 26, 1947 |
| 2,429,516 | Jergens | Oct. 21, 1947 |
| 2,641,940 | White | June 16, 1953 |